(12) United States Patent
Kelso et al.

(10) Patent No.: US 6,215,066 B1
(45) Date of Patent: Apr. 10, 2001

(54) OUTLET COVERING PLATE

(75) Inventors: Francis Frederick Kelso; James Patrick Reilly, both of Camarillo, CA (US)

(73) Assignees: Francis F. Kelso; James P. Reilly, both of Camarillo, CA (US)

( * ) Notice: Subject to any disclaimer, the term of this patent is extended or adjusted under 35 U.S.C. 154(b) by 0 days.

(21) Appl. No.: 09/130,237

(22) Filed: Aug. 6, 1998

(51) Int. Cl.[7] .................................................. H02G 3/14
(52) U.S. Cl. ................................... 174/66; 439/373
(58) Field of Search ........................ 174/66, 67; 439/374, 439/535, 236, 373

(56) References Cited

U.S. PATENT DOCUMENTS

| | | | |
|---|---|---|---|
| 4,504,698 | * 3/1985 | Greenwood | 174/66 |
| 4,936,789 | * 6/1990 | Ugalde | 439/236 |
| 5,272,281 | * 12/1993 | Bouley | 174/66 |
| 5,763,831 | 6/1998 | Shotey et al. | 174/67 |
| 5,837,932 | * 11/1998 | Carswell et al. | 174/66 |
| 5,965,846 | 10/1999 | Shotey et al. | 174/66 |
| 5,981,875 | * 11/1999 | Kesler et al. | 174/66 |
| 6,005,190 | * 12/1999 | Stark et al. | 174/66 |

* cited by examiner

Primary Examiner—Meng-Al T. An
Assistant Examiner—Jungwon Chang
(74) Attorney, Agent, or Firm—Henry G. Kohlman

(57) ABSTRACT

A cover plate for entirely covering an existing duplex electrical outlet having two electrical receptacles without having to replace the entire electrical outlet or adding extenders to the electrical plug which is inserted into the orifices in the receptacles or adding extenders to the receptacles, comprising a primary outer surface; a perimeter surface which is capable of resting against the wall in which the duplex outlet has been installed; chamfers extending from said outer primary surface to said perimeter surface; an inner primary surface parallel to said primary outer surface configured so that may rest directly upon the duplex electrical outlet; a plurality of orifices corresponding in size, number and configuration extending through said primary outer and inner surfaces, whereby when the cover plate is attached to the duplex electrical outlet, the orifices in said cover plate will lie directly over the corresponding orifices in said outlet receptacle such that an electrical plug may be inserted into said plurality of orifices in said cover plate directly into the corresponding orifices in the electrical receptacles in the outlet; and wherein the electrical receptacles in the outlet are completely enclosed within said cover plate such that they are no longer visible.

9 Claims, 3 Drawing Sheets

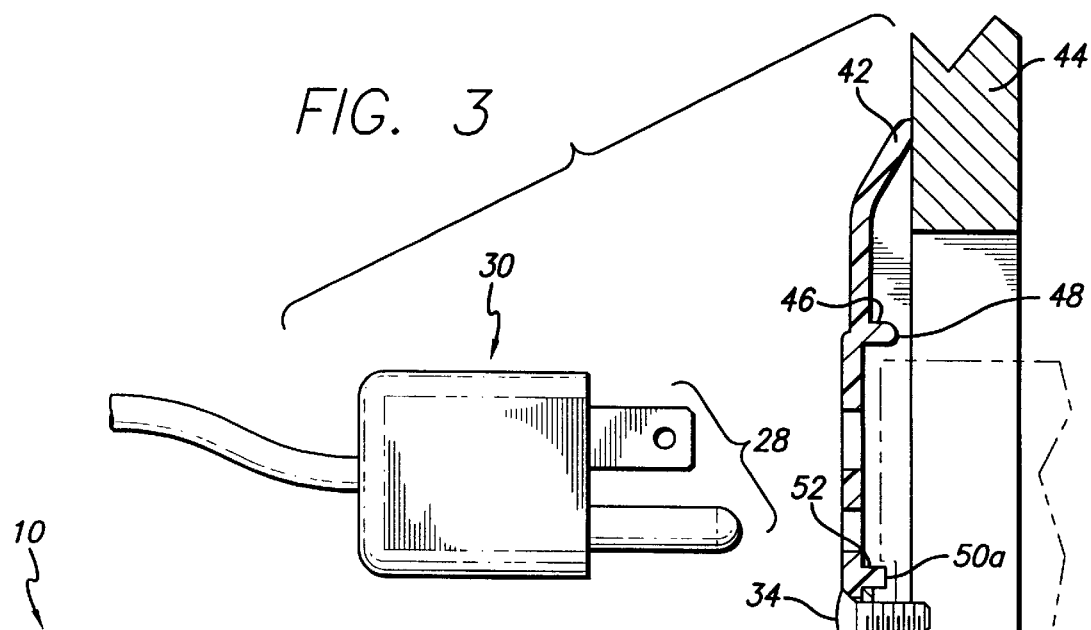
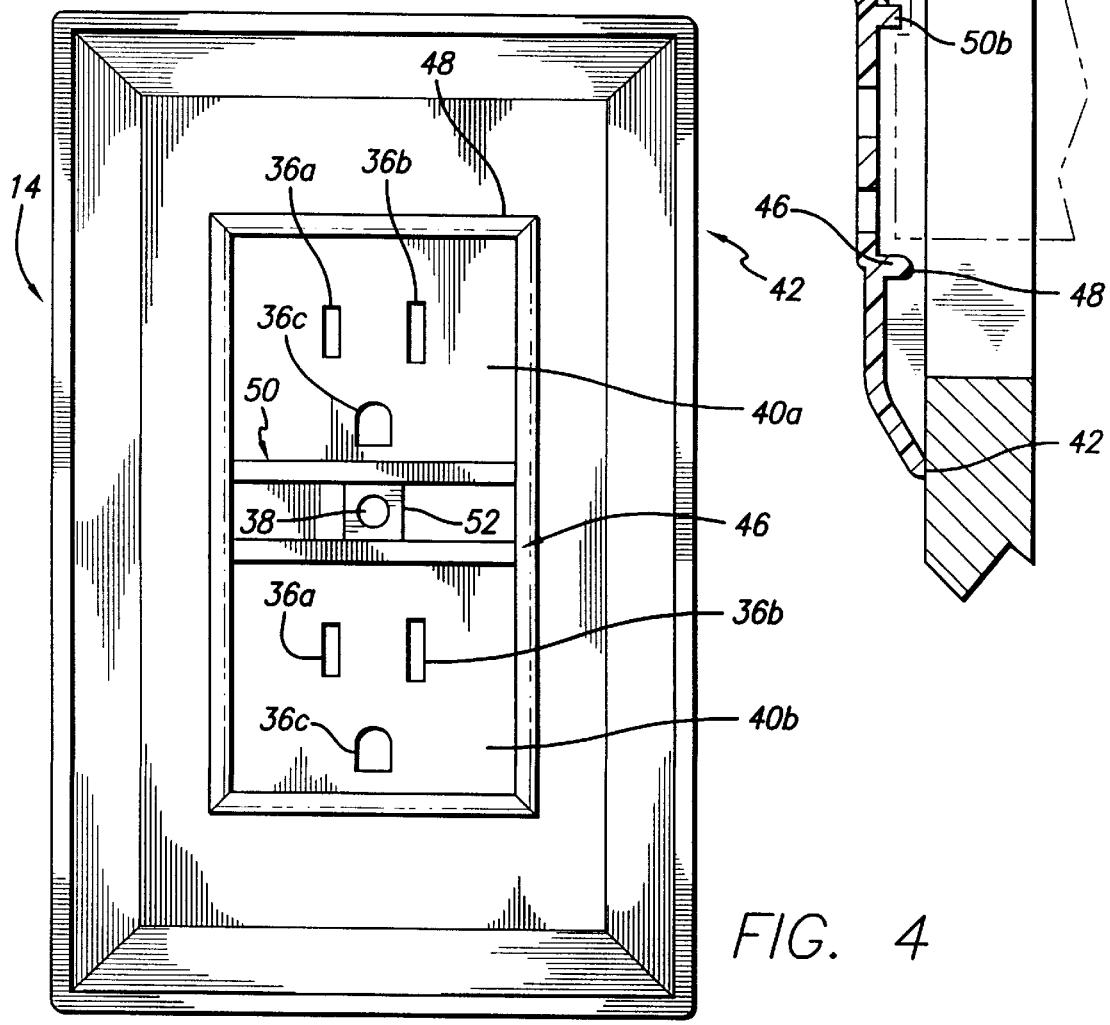

OUTLET COVERING PLATE

BACKGROUND OF THE INVENTION

1. Field of the Invention

The invention relates generally to the field of duplex cover plates for electrical outlets and the like and, more particularly, to a wall-mountable duplex outlet cover plate that fits over pre-existing electrical outlets to improve its appearance.

2. Prior Art

Conventional duplex outlet assemblies are well known and used throughout the United States. These conventional outlet assemblies usually comprise two partially rounded parallel and spaced apart electrical receptacles which are straight on the top and bottom and rounded on the sides, which are interconnected by a base plate. In the prior art, the face plate that covers such duplex outlet assemblies, usually has two corresponding straight top and bottom orifices through which the duplex outlet receptacles protrude. The portion of the face place proximate the two orifices covers the remaining, aesthetically undesirable elements of the electrical wiring and duplex outlet mechanism. The duplex outlet assembly has one standard screw hole, which aligns with a corresponding hole in the center of the face plate. By placing a screw through the face plate hole, the face plate is fixedly mounted onto the duplex outlet assembly.

As people update their homes, they also want to update their face plates and switches. One of the problems encountered by persons seeking to modernize or otherwise change the outward appearance of such standard duplex outlets and face plates is that the existing infrastructure of the electrical components is so established in the art that it impedes substantial design changes, without complete replacement of the duplex outlet assembly. Since the duplex outlet assembly is directly connected to live electrical wiring, complete replacement of the duplex outlet assembly cannot be easily completed by many homeowners and do-it-yourself-ers, because many of these persons do not feel comfortable handling electric wiring themselves. Thus, since many homes have a multitude of such duplex outlets, the cost of having an electrician replace all of them with more modern duplex outlets could be cost prohibitive.

Thus, in the prior art, the simplest and least costly prior art method used by homeowners and do-it-yourself-ers to update such electrical outlets merely was to replace or otherwise modify only the face plate so that it will coordinate with other design elements (wallpaper, wall color, carpeting and the like) in the room. However, using this method, the design, color or shape of the electrical receptacles in the old duplex outlet assembly did not change and remained visible after installation of the updated face plate. Since the color or shape of the visible electrical receptacles often conflicted with the style and/or color of the new updated face plate and/or did not fit over or lay properly atop the original duplex outlet assembly, in order to install a completely updated duplex outlet, the time-consuming and costly replacement of the entire duplex outlet mechanism and face plate was required.

Therefore, there has been a long felt need to find a means of updating old duplex outlets in such a way that the duplex outlet mechanism would not have to be replaced. Specifically, there is the need in the art for a face plate assembly that can cover the existing interior electrical components in such a way which makes use of the existing electrical infrastructure while hiding the duplex outlet, which would conflict aesthetically with a cover plate of a different color or design and which may be installed by homeowners and/or do-it-yourself-ers, without the need for an electrician.

OBJECTS OF THE INVENTION

It is therefore an object of the present invention to provide an exterior face plate assembly for an electrical boxes containing a duplex outlet wherein the existing electrical infrastructure is retained and yet the normally visible duplex outlet receptacles are wholly obscured.

It is a further object to provide a face plate assembly for a duplex outlet to facilitate converting an existing duplex outlet into an outlet that has a different style, shape, and/or color.

Another object is to provide a face plate assembly for a duplex outlet where by the normally visible duplex outlet is obscured by an integrated duplex outlet assembly of homogeneous style, shape and/or color.

SUMMARY OF THE INVENTION

The present invention comprises a face plate assembly and a method for easily updating or changing the outward appearance of at least one conventional duplex outlet assembly unit having two partially rounded parallel and spaced apart electrical receptacles which are straight on the top and bottom and rounded on the sides, and which are interconnected by a base plate having one centrally positioned standard screw hole.

In the preferred embodiment of the present invention, the face plate assembly comprises a substantially rectangular substrate of a desired style, color and shape. The substrate has a plurality of holes which correspond in size, number and configuration to the holes in the conventional duplex outlet electrical receptacles so as to facilitate the inserting of a plug of standard design through the face plate assembly directly into the duplex outlet receptacles in order to create an electrical connection without the need for extenders either in the outlet or the plug. Further, the face plate assembly of the present invention has one standard screw hole that corresponds to the centrally located duplex outlet screw hole.

The face plate assembly of the present invention further comprises a plurality of ridges which are located on the underside thereof. The ridges are configured so that the duplex outlet receptacles will lie between them and so that the face plate will sit atop and lay substantially flush over the duplex outlet receptacles and lay flush to the wall.

In the preferred embodiment, the face plate of the present invention is made of one piece construction in which the front of the face plate is as thick as the back of the face plate and is shaped so that it rests on the already existing oval duplex outlet housing rather than extending above it. Further, the cover plate of the present invention has relatively large chamfers which extend around the perimeter of the substantially rectangular front face. The chamfers have a full radius bevel proximate the front face and is joined to the perimeter of the cover plate by a small radius. In this manner, the perimeter of the cover plate of the present invention is more gently sloped and extends closer to the central rectangle front face portion than prior art devices. In addition, in the preferred embodiment, the corners of the cover plate have a variable fillet which tapers from the front face to the smaller radius proximate the perimeter of the cover plate so that the cover plate has no sharp corners on it whatsoever.

Therefore, the present invention updates old duplex outlet covers plates without having to replace the duplex outlet. Further, unlike the cover plates in the prior art, due to its one piece construction, the cover plate of the present invention is easier to manufacture and install, since it requires no electrician to install it on the existing outlet.

BRIEF DESCRIPTION OF THE DRAWINGS

FIG. 3 is a cross sectional view of the right side of the duplex outlet plate cover shown in FIG. 1 taken along lines 3—3.

FIG. 4 is a rear elevational view of the duplex outlet plate cover of the present invention which has been installed on a conventional duplex outlet assembly.

DESCRIPTION OF PREFERRED EMBODIMENTS

Figure 5:
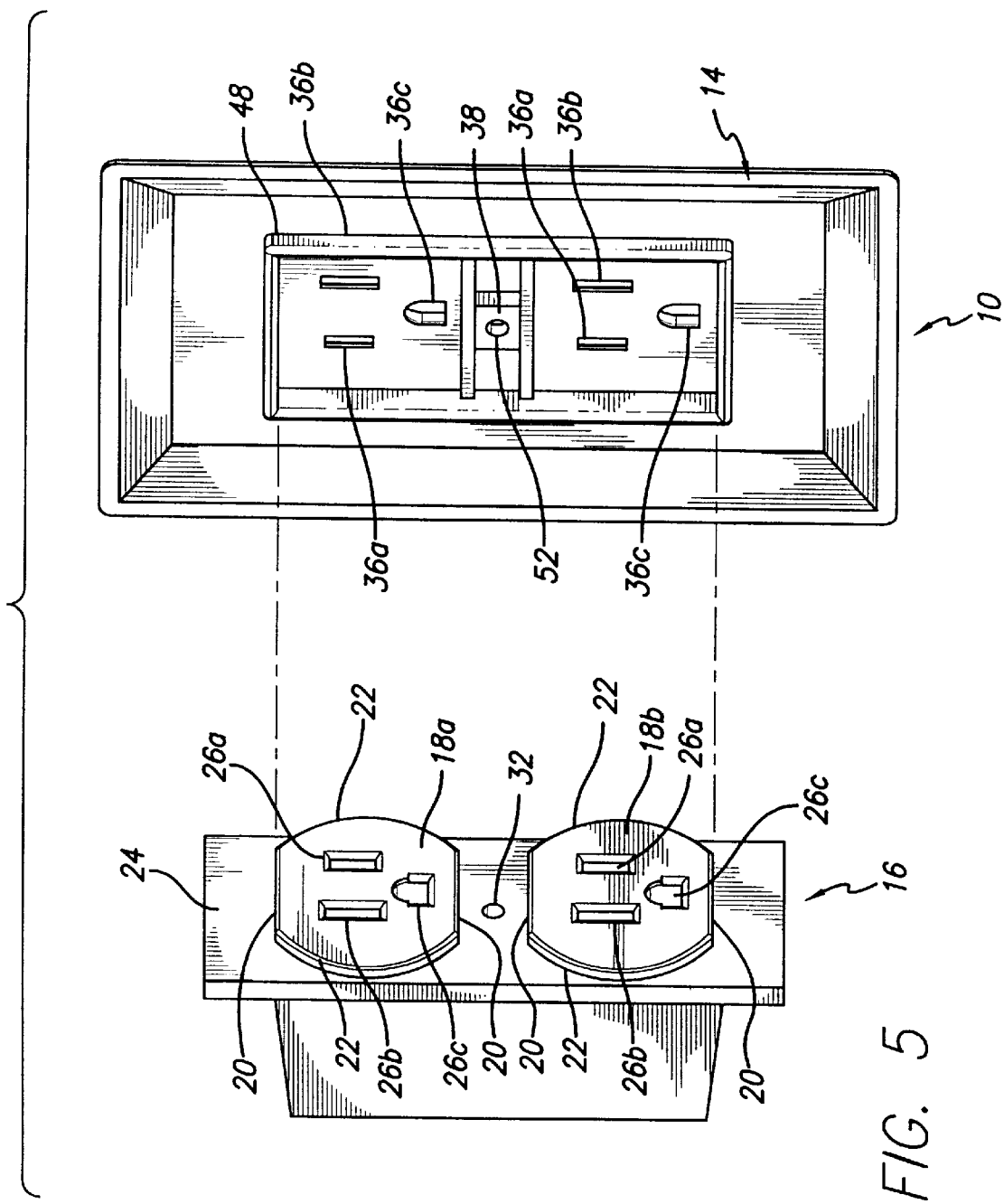
FIG. 5 is an exploded perspective view of the rear of the duplex outlet plate cover of the present invention and the left front of a conventional duplex outlet assembly.

Referring first to FIG. 5, a duplex outlet assembly 16 of standard design e.g. having two electrical receptacles 18a and 18b which are each flat along the upper and lower edges 20 and curved on each side edge 22 and which extend through mounting bracket 24 is shown. Electrical receptacles 18a and 18b each have three orifices 26a, 26b and 26c into which the prongs 28 of a standard electrical three-prong plug 30 (such as the plug 30 shown in FIG. 3 ) may be installed. Centrally located on mounting bracket 24, between the two electrical receptacles 18a and 18b, is a mounting hole 32 through which a connector such as a threaded screw 34 (shown in FIGS. 1, 2 and 3) may be placed to affix the cover plate 10 to the duplex outlet assembly 16.

Figure 1:
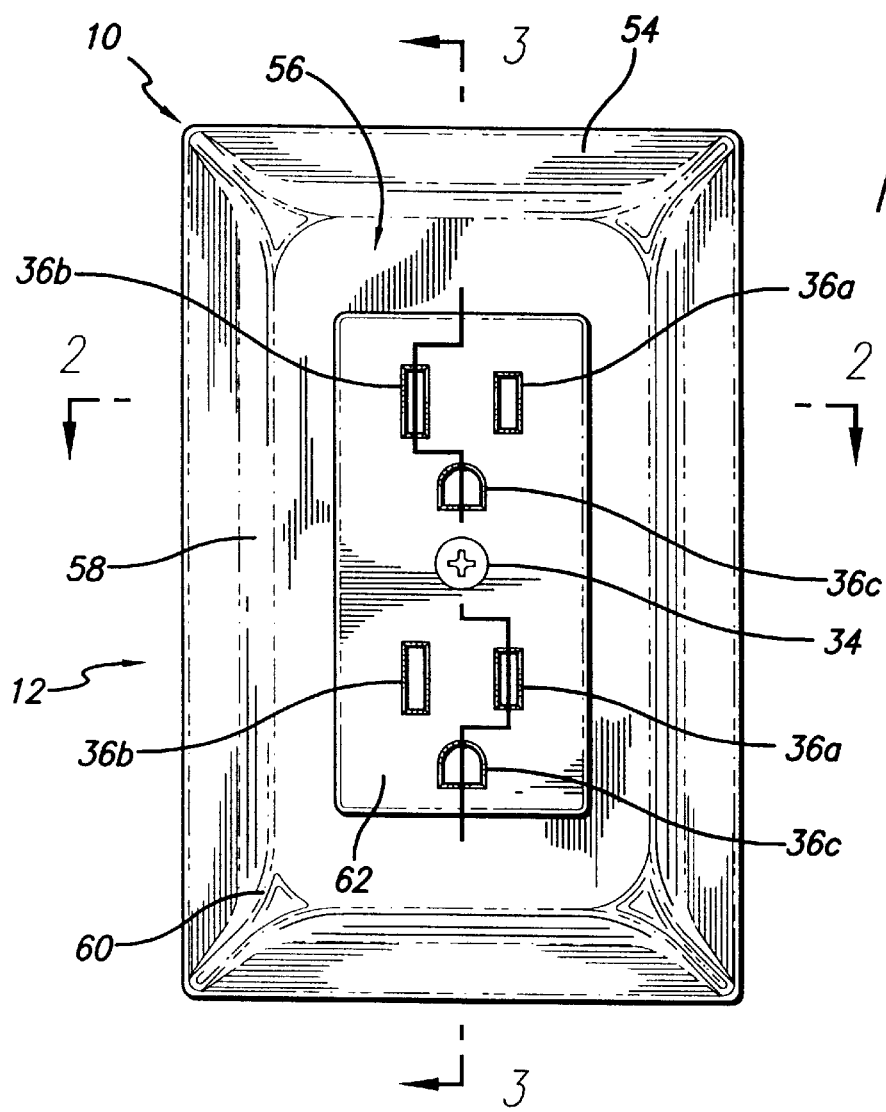
FIG. 1 is a front elevational view of the front of the duplex outlet plate cover of the present invention which has been installed on a conventional duplex outlet assembly.
Figure 2:
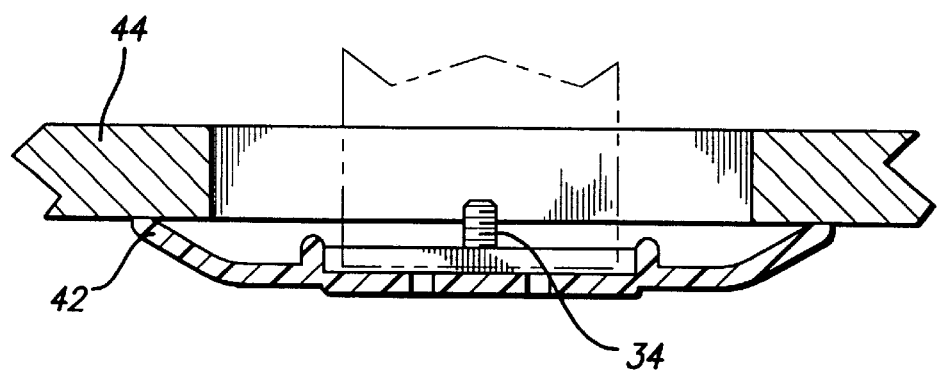
FIG. 2 is a cross sectional view from the top of the duplex outlet plate cover shown in FIG. 1 taken along lines 2—2.

Referring next to FIGS. 1, 4 and 5, the front 12 and back 14 of the duplex outlet plate cover 10 of the present invention is shown. The cover 10 has three orifices 36a, 36b, 36c in the upper and lower halves thereof into which the prongs 28 of a standard electrical three-prong plug 30 (such as the plug 30 shown in FIG. 3 ) may be installed. Each of the orifices 36a, 36b and 36c in cover 10 correspond to and are configured so that they are identical to orifices 26a, 26b and 26c, respectively, in duplex outlet mounting assembly 16. Cover 10 also contains a threaded mounting hole 38 which corresponds to mounting hole 32 in the duplex outlet assembly 16, so that the duplex outlet cover plate 10 may be attached to the duplex outlet assembly 16 and so that the surface areas 40a and 40b on the back 14 of the cover plate 10 proximate orifices 36 will rest atop of electrical receptacles 18a and 18b, and edge 42 around the perimeter of the back 14 of the cover plate will rest substantially against and parallel to the wall 44, as shown in FIGS. 2 and 3.

Referring specifically to FIGS. 2–5, means 46 are shown which extend from the back 14 of face plate 10 and which surround the periphery of areas 40a and 40b. In the preferred embodiment, the outer surface 48 of means 46 shall be a radius to facilitate the placement of the cover plate 10 over the electrical receptacles 18a and 18b of duplex outlet assembly 16. Spacer means 50a and 50b are also shown. Spacer means 50a and 50b also extend from the back 14 of face plate 10 proximate mounting hole 38, and are perpendicular to means 46, and in the preferred embodiment are fabricated such that they may rest upon mounting bracket 24 in the area proximate hole 32 as shown in FIGS. 3 and 5. In addition, in the preferred embodiment there is threading means 52, which extends between spacer means 50 a and 50b on the rear 14 of cover plate 10 to act as additional support for the mounting screw 34.

Referring again to FIGS. 3 and 5, when face plate 10 is affixed to duplex outlet assembly 16, the duplex outlet assembly 16 is completely covered by the face plate 10.

However, due to the relationship between orifices 36 in the face plate 10 and the corresponding orifices 26 in duplex assembly 16, an electrical plug from an extension cord or any electric appliance may be inserted through the cover plate 10 into the corresponding orifices 26 in electrical receptacles 18a and 18b. In this manner, as people update their homes and desire to install more modem looking faceplate covers, they will not have to replace the original duplex outlet. Thus, using the assembly of the present invention, many homeowners and do-it-yourselfers do not have to handle the electric wiring themselves or be forced to hire an electrician.

In the preferred embodiment, the face plate of the present invention is made of one piece construction in which the front of the face plate is as thick as the back of the face plate and is shaped so that it rests on the already existing oval duplex outlet housing rather than extending above it. Further, the cover plate of the present invention has relatively large chamfers 54 which extend around the perimeter of the large substantially rectangular front face 56. The chamfers each have a full radius bevel 58. The chamfers 54 then are joined to edge 42 by a small radius. In this manner, the perimeter of the cover plate of the present invention is more gently sloped and extends closer to the central rectangle portion 62 than prior art devices.

In addition, in the preferred embodiment, the corners 60 of cover plate 10 have a variable fillet which tapers from the front face 56 to the smaller radius proximate the perpendicular face so that the cover plate has no sharp corners on it whatsoever. Further, the entire rectangular portion 62 of the front 12 has no indentations in it.

Therefore, the present invention updates old duplex outlet covers plates without having to replace the duplex outlet. Further, unlike the cover plates in the prior art, due to its one piece construction, the cover plate of the present invention is easier to manufacture and install, since it requires no electrician to install it on the outlet. It fits over existing old oval duplex outlets without the need for plug extenders.

Thus, the assembly of the present invention covers the existing interior electrical components in such a way which makes use of the existing electrical infrastructure while hiding the old style duplex outlet which would conflict aesthetically with a cover plate of a different color or design. Further, the configuration of the cover plate permits decorative color and texture change and gives a softer, subtler look to wall surfaces than prior art devices.

While particular embodiments of the invention have been shown and illustrated herein, it will be understood that many changes, substitutions and modifications may be made by those persons skilled in the art. It will be appreciated from the above description of presently preferred embodiments that other configurations are possible and within the scope of the present invention. Thus, the present invention is not intended to be limited to the particular embodiments specifically discussed hereinabove.

What is claimed is:

1. A cover plate for entirely covering an electrical outlet which includes a first receptacle and a second receptacle, each receptacle having a plurality of orifices shaped to receive the corresponding prongs on an electrical plug inserted into said electrical outlet, said first and second receptacles mounted on a mounting bracket, supported within a supporting surface, having a hole located between the first and second receptacles, said cover plate comprising:

a. an outer surface having a decorative finish;
  b. an inner surface disposed substantially parallel to said outer surface and spaced apart therefrom a generally uniform distance;
  c. extension means attached to and extending from said inner surface for receiving at least part of the first and second receptacles within said extension means;
  d. a plurality of cover plate orifices located within and extending through said cover plate, each of said orifices corresponding in size, shape and configuration to corresponding orifices of said plurality of orifices in the first and second receptacles;
  e. mounting means corresponding to the hole in the mounting bracket of the electrical outlet for mounting the cover plate to the electrical outlet such that said cover plate orifices will be located directly over the corresponding orifices in the first and second receptacles;

whereby when said cover plate is affixed to the electrical outlet, an electrical plug may be inserted into said plurality of orifices in said cover plate directly into the corresponding orifices in the first and second receptacles in the outlet.

2. The cover plate of claim 1 further comprising:
  a. perimeter means extending around the perimeter of said inner surface for engaging said supporting surface.

3. The cover plate of claim 1 wherein said extension means further comprises a radial outer surface to facilitate the placement of the cover plate over the electrical receptacles of the outlet.

4. The cover plate of claim 1 further comprising spacer means extending from said inner surface such that said spacer means rests upon the mounting bracket adjacent the mounting hole.

5. The cover plate of claim 1 further comprising chamfers with a full radius beveled edge, said chamfers gently sloping away from said outer exposed surface towards the wall.

6. The cover plate of claim 5 wherein said chamfers are joined together by corners comprising a variable fillet which tapers from the outer exposed surface to a smaller radius proximate the perimeter of the cover plate, so that the cover plate has no sharp corners.

7. A cover plate for entirely covering a duplex electrical outlet having a plurality of receptacles, each receptacle having a plurality of orifices for receiving the prongs of at least one electrical plug, said cover plate comprising:

a. an outer surface;
  b. a perimeter surface for engaging a wall or other surface in which the duplex outlet has been installed;
  c. chamfers extending from said outer surface to said perimeter surface;.
  d. an inner surface for covering the surface of the duplex electrical outlet, said inner surface having at least one extension apparatus attached to and extending away from said inner surface for receiving at least one of said receptacles; and
  e. said cover plate having a plurality of orifices corresponding in size, number and configuration to the orifices of at least one of said plurality of electrical receptacles, extending through said outer surface and said inner surface, whereby when the cover plate is attached to the duplex electrical outlet the electrical receptacles in the outlet are completely covered by said cover plate except for the plurality of orifices of said receptacles.

8. The cover plate of claim 7 wherein said chamfers are joined together by corners comprising a variable fillet which tapers from the outer exposed surface to a smaller radius proximate the perimeter of the cover plate, so that the cover plate has no sharp corners.

9. A cover plate as described in claim 7 wherein said plurality of orifices of said cover plate are disposed in an offset region of said cover plate which forms a raised area on the outer surface and a recessed area on said inner surface said offset region having generally the same thickness as the remaining portions of the cover plate.

* * * * *